(12) United States Patent
Bennett

(10) Patent No.: US 6,931,786 B1
(45) Date of Patent: Aug. 23, 2005

(54) FISHERMAN'S SINKER-BOBBER

(75) Inventor: Robert A. Bennett, Easton, CT (US)

(73) Assignee: Precision Valve Corporation, Yonkers, NY (US)

( * ) Notice: Subject to any disclaimer, the term of this patent is extended or adjusted under 35 U.S.C. 154(b) by 582 days.

(21) Appl. No.: 08/974,341

(22) Filed: Nov. 19, 1997

(51) Int. Cl.$^7$ ................................................ A01K 93/00
(52) U.S. Cl. ...................................... 43/44.89; 43/44.91
(58) Field of Search ............................. 43/44.87, 44.89, 43/44.9, 44.91, 44.92, 44.95

(56) References Cited

U.S. PATENT DOCUMENTS

| | | | | |
|---|---|---|---|---|
| 1,240,043 A | * | 9/1917 | Gregory | 43/44.91 |
| 2,428,497 A | * | 10/1947 | Meek | 43/44.89 |
| 3,107,451 A | * | 10/1963 | Sitzler | 43/44.92 |
| 3,747,257 A | * | 7/1973 | Olsen | 43/44.92 |
| 4,780,981 A | * | 11/1988 | Hayward | 43/44.89 |
| 5,377,443 A | * | 1/1995 | Giray | 43/44.92 |

* cited by examiner

Primary Examiner—Kurt Rowan
(74) Attorney, Agent, or Firm—Kilgannon & Steidl

(57) ABSTRACT

A fisherman's bobber takes the form of a hollow one piece plastic spheroid having two mating halves joined together by corresponding portions of a living hinge. The hinge extends outwardly from both halves. The interior peripheral surfaces of both halves are contoured to enable the halves to be joined together in locking engagement when the halves are pressed together and to permit the halves to be unlocked and swung apart when squeezed together. The portions of the hinge when the halves are locked together hold a fishing line in locking engagement therebetween.

1 Claim, 3 Drawing Sheets

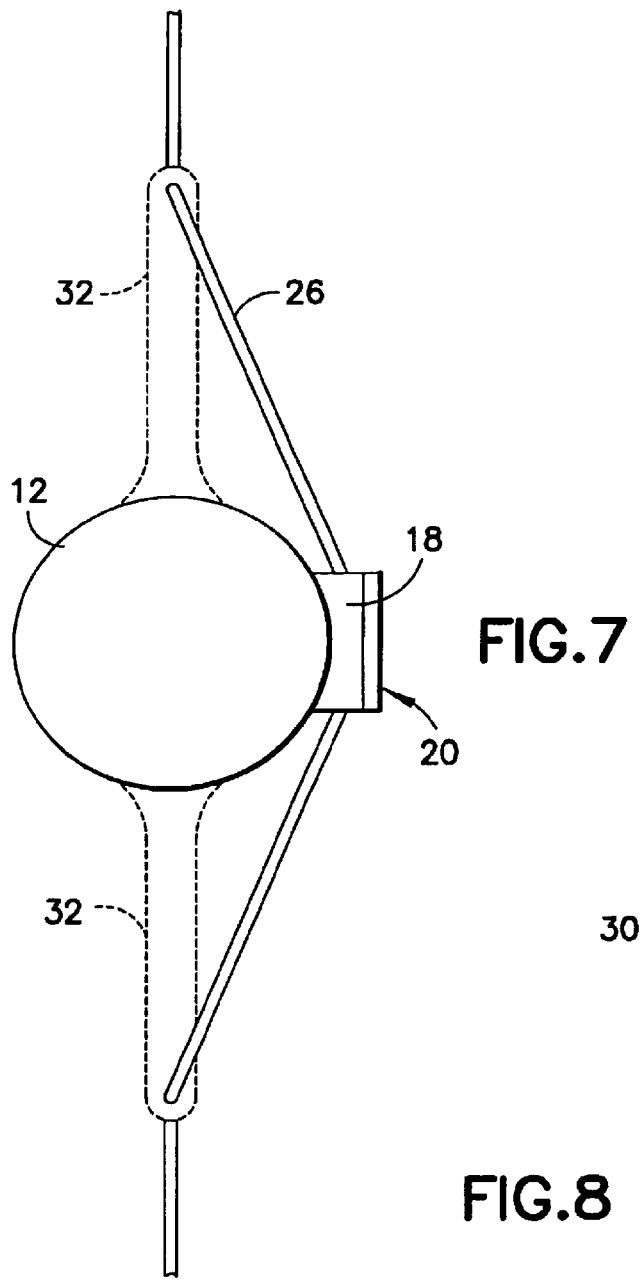
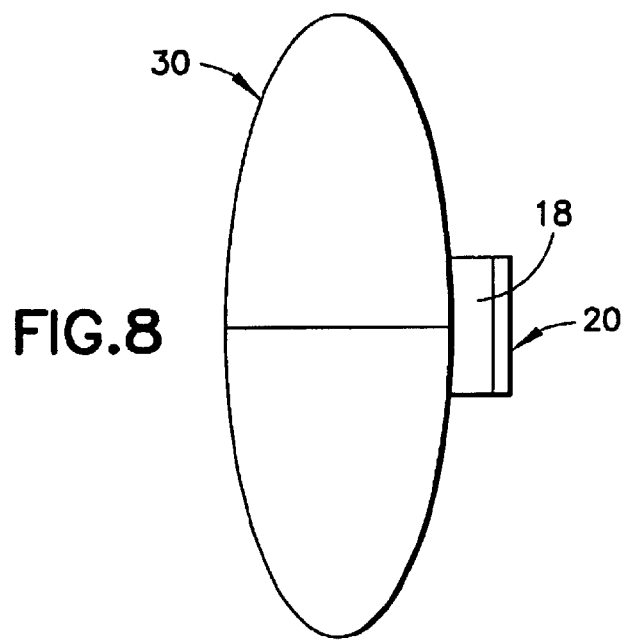

FISHERMAN'S SINKER-BOBBER

BACKGROUND OF THE INVENTION

A fisherman's bobber is a device which when secured to a fishing line disposed in water will float on the surface of the water and will bob up and down when a fish takes a hook at the end of the line. Conventional bobbers are relatively expensive and must be assembled using five or more metal and plastic parts.

The present invention is directed toward a hollow plastic bobber which can be molded inexpensively as a single piece unit. Moreover, uniquely, the bobber can removably contain heavier than water material and used as a sinker. The bobber action can be readily restored by removing the material.

SUMMARY OF THE INVENTION

In accordance with the principles of this invention, a fisherman's bobber takes the form of a hollow one piece plastic spheroid having two mating halves joined together by corresponding portions of a single living hinge. The hinge extends outwardly from both halves.

The interior peripheral surfaces of both halves are contoured to enable the halves to be joined together in locking engagement when the halves are pressed together and to permit the halves to be unlocked and swung apart when squeezed together. The portions of the hinge when the halves are locked together holds a fishing line in locking engagement therebetween.

The plastic material employed in this bobber, such as a coploymer of polypropylene, has a specific density of less than one, that is less than the density of water, so it cannot sink even if it leaks and is filled with water.

In order to provide the locking and unlocking actions of the halves, the contoured surfaces can take the shape of an inner groove on the periphery of one half and an inner land engagable with the groove on the periphery of the other half.

Uniquely, this bobber can be converted into a sinker without the conventional use of lead by partially filling the bobber with material heavier than water, as for example using rocks or sand. Once the material is removed, the bobber action is automatically restored.

Other objects and advantages of this invention will either be explained or will become apparent hereinafter.

BRIEF DESCRIPTION OF THE DRAWINGS

FIGS. 7 and 8 shown different spheroidal shapes which can be used in place of the structures shown in FIGS. 1–6.

DETAILED DESCRIPTION OF PREFERRED EMBODIMENTS

Figure 1:
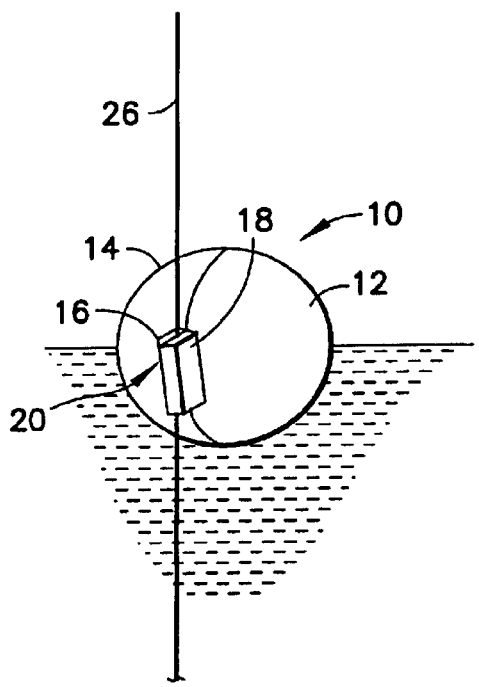
FIG. 1 shows one embodiment of the invention in use.
Figure 2:
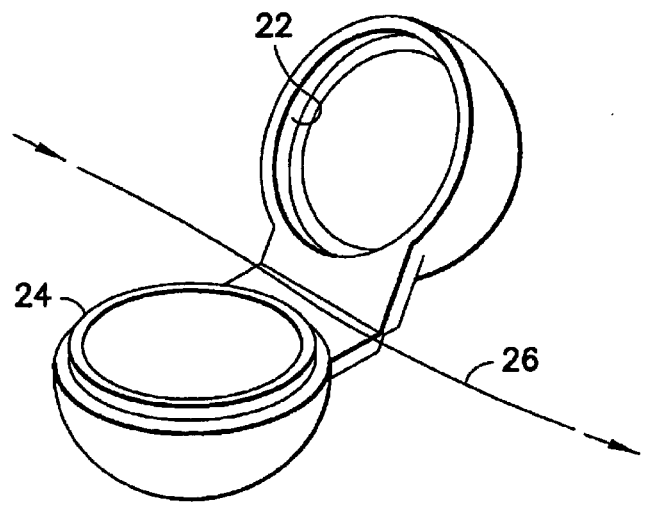
FIG. 2 is a perspective view of one embodiment of the invention with spheroidal halves in open front position.
Figure 3:
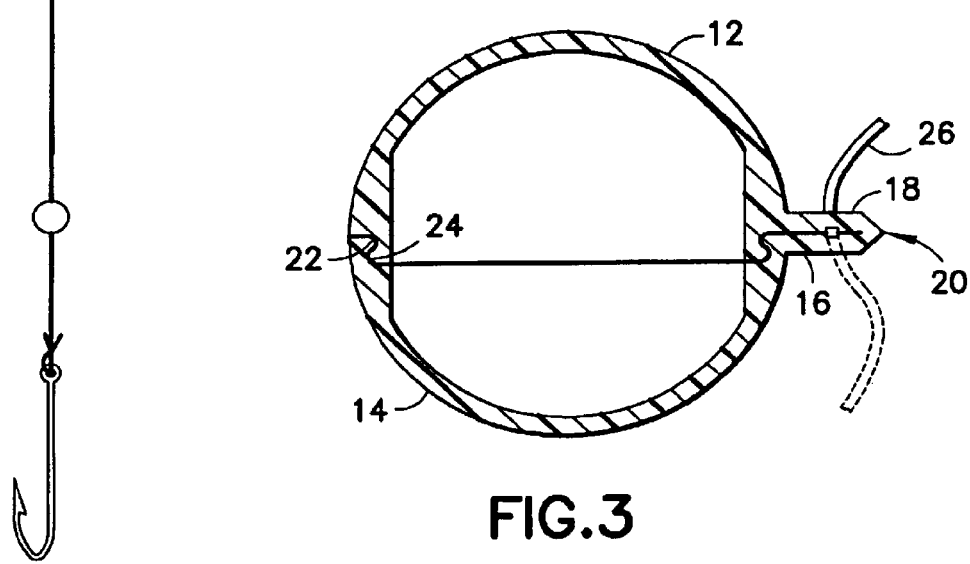
FIG. 3 is a cross sectional view of the embodiment of FIG. 2 in closed position.
Figure 4:
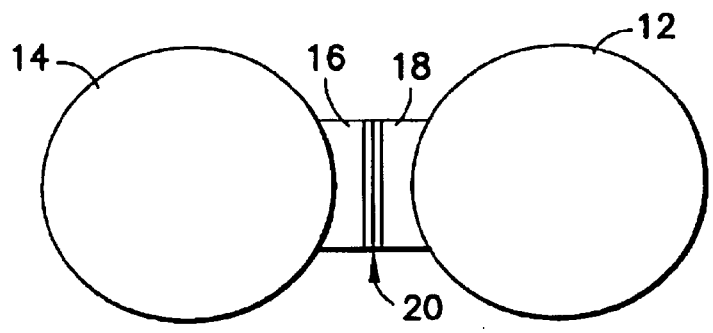
FIG. 4 is a rear view of the embodiment shown in FIG. 2.

Referring first to FIGS. 1–6, there is shown a bobber 10 consisting of a hollow one piece plastic spheroid having two mating hemispherical halves 12 and 14 joined together by corresponding portions 16 and 18 of a living hinge 20. Portions 16 and 18 extends outwardly from corresponding halves 12 and 14.

The interior peripheral surfaces of both halves are contoured to enable the halves to be joined together in locking engagement when the halves are pressed together and to permit the halves to be unlocked and swung apart when squeezed together.

In this embodiment, the contoured surfaces comprise an inner groove 22 on the periphery of one half and an inner land 24 engagable with the groove on the periphery of the other half.

Figure 5:
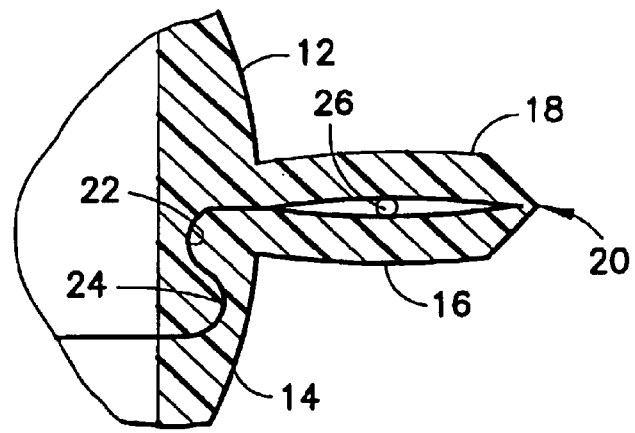
FIG. 5 is a detail cross sectional view of a portion of the embodiment shown in FIG. 3.
Figure 6:
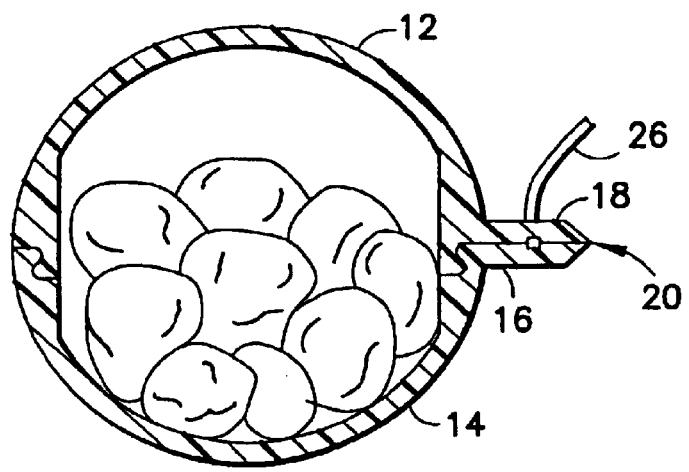
FIG. 6 is a view similar to that of FIG. 3 in which the embodiment of FIG. 3 can be used as a sinker.

The portions 16 and 18 of the hinge when the halves are locked together hold a fishing line 26 in locking engagement therebetween. When the line 26 is relatively large in cross section, as shown in FIG. 5, the portions 16 and 18 may bow outward but will still be held together because of the locking engagement of the hemispherical halves.

The bobber is thus formed of one piece of plastic having a specific density of less than one, such as a copolymer of polypropylene, and cannot sink even if water leaks into the engaged halves. However, the bobber can be opened and a material having a specific density greater than one, that is heavier than water, such as rocks 28 or sand, can be inserted. When the bobber is closed and contains this material, the bobber will sink in water and function as a sinker. Once the material is removed, the bobber can again be used as shown in FIG. 1.

The spheroidal shape is not limited to that of a sphere. As shown in FIGS. 7 and 8, the bobber can assume the shape of a football 30, or can have spherical extensions 32.

While the invention has been described with particular reference to the drawings and to preferred embodiments, the protection solicited is to be limited only by the terms of the claims which follow.

What is claimed is:

1. A fisherman's bobber comprising a hollow one-piece spheroid formed from joining free-edged cup-like mating halves, the density of the spheroid being less than the density of the aqueous medium into which the bobber is to be deployed, said bobber further having a living hinge joining together the said mating halves of the spheroid, said hinge further including hinge segments extending outwardly from the edge of each of the cup-like halves and the edge of the cup-like mating halves being configured to interlock the mating halves of the spheroid when the halves are pressed together in mating relationship and to permit the halves to be unlocked and swing apart when squeezed together along the seam of joinder between the mating halves, and the living hinge being capable of holding a fishing line when the mating halves of the spheroid are interlocked.

* * * * *